Jan. 14, 1930.  H. L. FANSLAU ET AL  1,743,442
FLAG HOLDER
Filed July 23, 1927
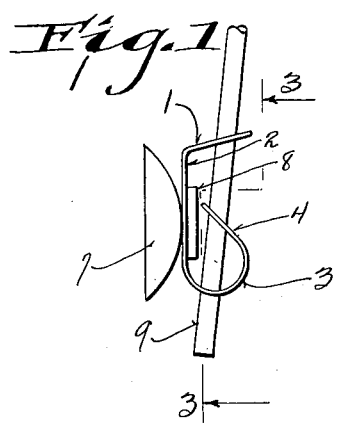
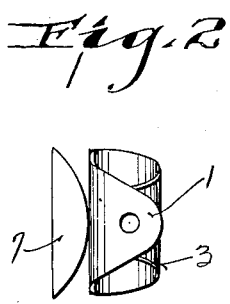
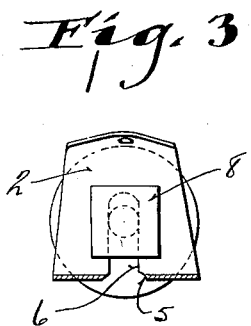
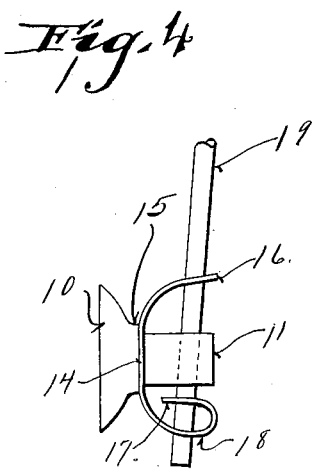
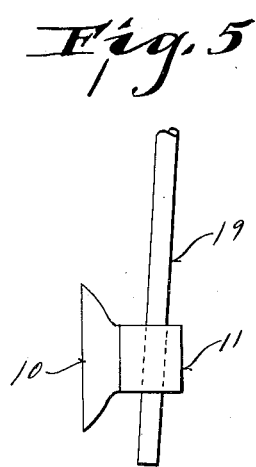
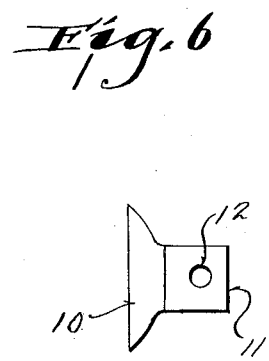
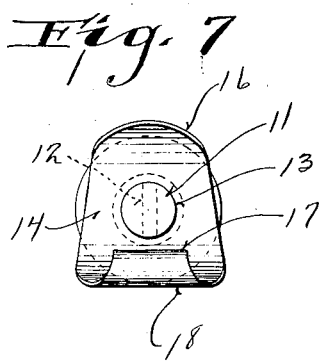
Inventors
Henry L. Fanslau
Walter L. Mahnke Patented Jan. 14, 1930

1,743,442

UNITED STATES PATENT OFFICE

HENRY L. FANSLAU AND WALTER L. MAHNKE, OF MANITOWOC, WISCONSIN

FLAG HOLDER

Application filed July 23, 1927. Serial No. 207,874.

This invention relates to holders, and is particularly directed to a flag holder.

Objects of this invention are to provide a novel form of holder for the staff of flags or similar members which is so constructed that it may be stuck to the windshield or other portion of an anutomobile and will securely retain itself in position, and which will firmly hold the flag against displacement.

Further objects of this invention are to provide a flag holder in which means are provided for securely engaging and holding the staff and are combined with a vacuum cup for retaining the device in position upon a windshield or similar surface.

A more specific object is to provide a holder having the characteristics enumerated above in which a simple means is provided for interlocking the vacuum cup and the flag staff engaging portion.

Embodiments of the invention are shown in the accompanying drawings in which:

Figure 1 is a side elevation of one form of holder;

Figure 2 is a plan view of the holder with the flag staff removed;

Figure 3 is a sectional view on the line 3—3 of Figure 1;

Figure 4 is a side elevation of a modified form of holder;

Figure 5 is a view corresponding to Figure 4 showing a further mode of employing the holder;

Figure 6 is a plan view of the structure shown in Figure 5;

Figure 7 is a rear view of the structure shown in Figure 4.

Referring to the drawings, particularly Figures 1 to 3, it will be seen that the flag holder comprises a sheet metal frame member provided with an outwardly projecting apertured tongue 1, a certical portion 2, and a curved portion 3, terminating in an upwardly directed lip 4. The lip 4 is provided with an aperture similar to that shown in the lip 1. The curved portion 3 is provided with a relatively large aperture 5 (see Figure 3) which merges into an elongated slot 6 so that the aperture 5 and slot 6 form in effect a keyhole slot for a purpose hereinafter to appear.

The suction cup 7 may be formed of rubber or similar material and is provided with a relatively large flat head 8 which is joined to the body of a cup by a restricted neck. The neck is fitted within the slot 6, the head 8 being easily compressed or folded to pass through the large aperture 5 of the key-hole slot. Thereafter, the frame member is slid downwardly into position and is securely retained. The flag staff 9 is passed through the apertures in the lips 1 and 4, as shown in Figure 1, and through the large aperture 5 in the rolled or curved portion 3. It is held at a suitable angle and is very securely retained by the three-point bearing afforded by the frame. Further, the device may be readily stuck on any portion of the car desired, for instance, on the windshield or door panel.

It is to be distinctly understood that the device is capable of other uses, and this detailed description of one use is to be understood as explanatory, rather than limiting.

Referring to the form shown in Figures 4 and 7, it will be seen that the suction cup 10 is provided with a relatively large shank 11 which is apertured, as indicated at 12 in Figure 6. The shank 11 is passed through an aperture 13 formed in the body portion 14 of the frame.

Further, it is to be noted that the cup 10 is provided with a thickened part or shouldered portion 15 which contacts with the front face of the body portion 14 of the frame, as shown in Figure 4. The frame is provided with an upper lip 16 and a lower inturned lip 17, both of which are apertured.

Further, the bottom portion 18 of the frame is also apertured and these apertures are in approximate alignment with the aperture 12 through the shank 11, so that a flag staff 19 may be threaded through these apertures. This flag staff, when so positioned, will lock the shank in place and hold the shouldered portion 15 in binding engagement with the front face of the body portion 14 of the frame and thus produce a very rigid construction.

It is apparent that in the event that the user does not desire to employ the frame, that he may pass the flag staff 19 through the aperture 12 of the shank 11, as shown in Figure 6, and may use the device in this manner.

It will be seen that a very simple and serviceable type of flag holder has been provided which may be very readily applied to any flat surface and which will securely retain the flag staff at an appropriate angle to such surface.

It will be noted further that the device may be most cheaply manufactured and easily assembled.

Although the invention has been described in considerable detail, such description is intended as illustrative rather than limiting as the invention may be variously embodied and as the scope of such invention is to be determined as claimed.

We claim:

A flag staff holder comprising a frame member including a vertical portion having a lateral apertured tongue at one end, a curved part at the other end, a tongue forming a continuation of the curved part and extended inwardly toward the vertical portion to form an inwardly directed apertured lip, said curved portion having an aperture and said vertical portion having a slot communicating at one end with the aperture, and a suction cup having a neck portion received within the slot and a substantially flat head portion adapted to have frictional contact with the inner end of the lip to assist in locking the suction cup to the vertical portion.

In testimony that we claim the foregoing we have hereunto set our hands at Manitowoc, in the county of Manitowoc and State of Wisconsin.

HENRY L. FANSLAU.
WALTER L. MAHNKE.